United States Patent
Boyapalle et al.

(10) Patent No.: US 11,979,327 B1
(45) Date of Patent: May 7, 2024

(54) MANAGED NETWORK TRAFFIC PRIORITIZATION

(71) Applicant: Dell Products, L.P., Round Rock, TX (US)

(72) Inventors: Anantha K. Boyapalle, Cedar Park, TX (US); Harpreet Narula, Austin, TX (US)

(73) Assignee: Dell Products, L.P., Round Rock, TX (US)

(*) Notice: Subject to any disclaimer, the term of this patent is extended or adjusted under 35 U.S.C. 154(b) by 0 days.

(21) Appl. No.: 18/313,407

(22) Filed: May 8, 2023

(51) Int. Cl.
| H04L 12/26 | (2006.01) |
| H04L 12/24 | (2006.01) |
| H04L 29/06 | (2006.01) |
| H04L 43/062 | (2022.01) |
| H04L 47/2416 | (2022.01) |
| H04L 47/762 | (2022.01) |

(52) U.S. Cl.
CPC ........ H04L 47/2416 (2013.01); H04L 43/062 (2013.01); H04L 47/762 (2013.01)

(58) Field of Classification Search
CPC . H04L 47/2416; H04L 43/062; H04L 47/762; H04L 12/26; H04L 12/24; H04L 29/06
USPC ........................................................ 709/224
See application file for complete search history.

(56) References Cited

U.S. PATENT DOCUMENTS

| 2006/0235973 | A1* | 10/2006 | McBride ................. H04L 67/53 709/226 |
| 2013/0064080 | A1* | 3/2013 | Kemmerer ............ H04L 47/822 370/230 |
| 2014/0143393 | A1* | 5/2014 | Martinez Perea .. H04L 41/0816 709/221 |
| 2016/0205071 | A1* | 7/2016 | Cooper ............... H04L 63/0209 726/1 |
| 2018/0270149 | A1* | 9/2018 | Jiao ..................... H04L 41/0893 |
| 2021/0306359 | A1* | 9/2021 | Gupta ..................... H04L 43/18 |
| 2021/0344612 | A1* | 11/2021 | Files ..................... H04L 41/149 |
| 2023/0032544 | A1* | 2/2023 | Proejts ................. H04B 7/0817 |
| 2023/0110141 | A1* | 4/2023 | Ramasamy .......... H04B 17/309 370/252 |

* cited by examiner

*Primary Examiner* — Jude Jean Gilles
(74) *Attorney, Agent, or Firm* — Fogarty LLP

(57) ABSTRACT

Systems and methods for Managed Network Traffic Prioritization (MNTP) are described. In an embodiment, an Information Handling System (IHS) operated by an Information Technology Decision Maker (ITDM) or administrator may include a processor and a memory coupled to the processor, the memory having program instructions stored thereon that, upon execution, cause the IHS to: identify one or more priorities applicable to network traffic handled by a client device based, at least in part, upon telemetry data received provided by the client device; and transmit, to the client device, a policy determined based, at least in part, upon the one or more priorities, wherein the client device is configured to apply the policy to the network traffic.

18 Claims, 5 Drawing Sheets

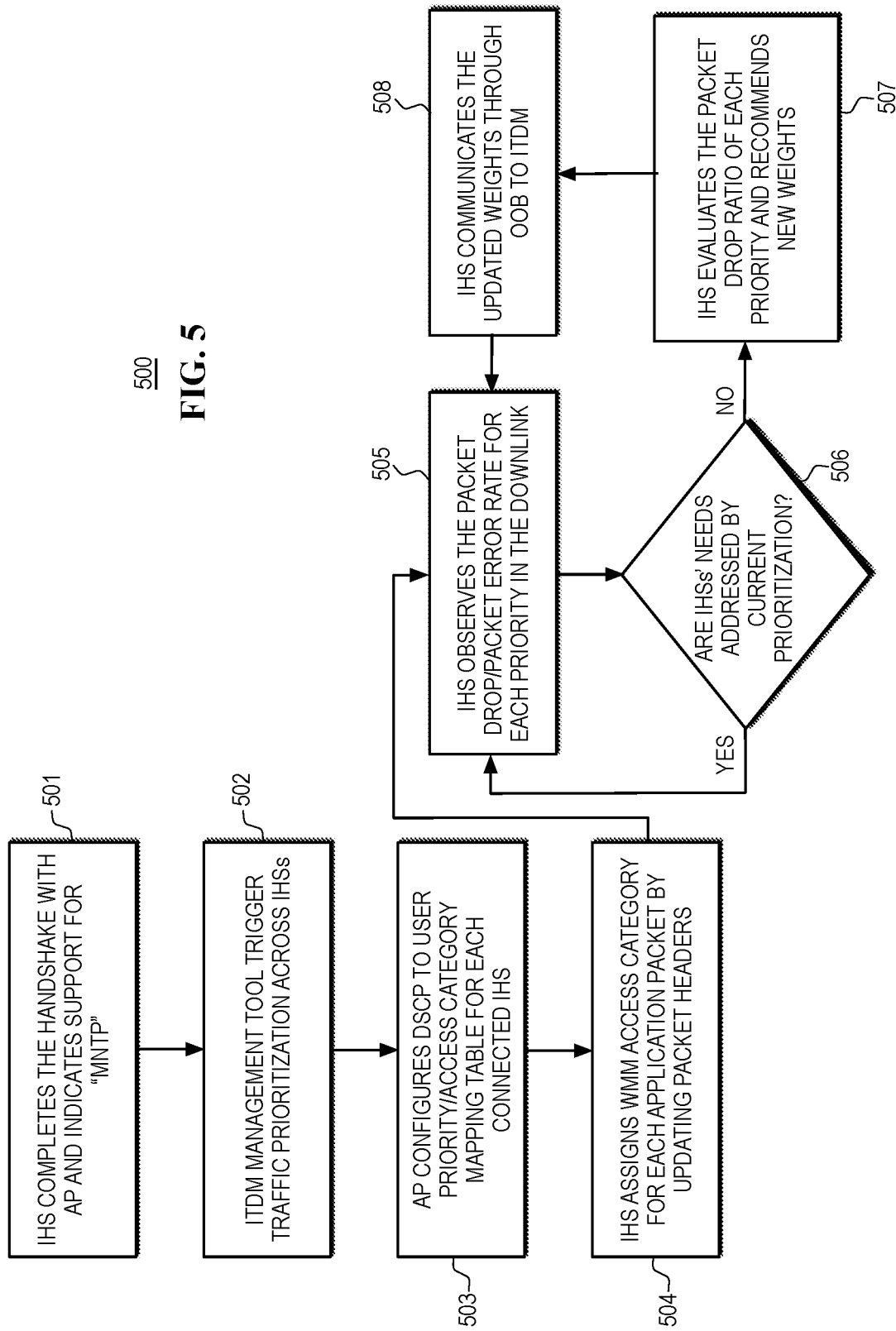

MANAGED NETWORK TRAFFIC PRIORITIZATION

FIELD

This disclosure relates generally to Information Handling Systems, and, more specifically, to systems and methods for providing Managed Network Traffic Prioritization (MNTP).

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for providing Managed Network Traffic Prioritization (MNTP) are described. In an illustrative, non-limiting embodiment, an Information Handling System (IHS) operated by an Information Technology Decision Maker (ITDM) or administrator may include a processor and a memory coupled to the processor, the memory having program instructions stored thereon that, upon execution, cause the IHS to: identify one or more priorities applicable to network traffic handled by a client device based, at least in part, upon telemetry data received provided by the client device; and transmit, to the client device, a policy determined based, at least in part, upon the one or more priorities, where the client device is configured to apply the policy to the network traffic.

The telemetry data may include an indication of at least one of: a number of packets or amount of data transmitted, a number of packets or amount of data received, a number of packet drops or errors, a latency metric, a throughput metric, packet tracing information, or a sample packet stream. Additionally, or alternatively, the telemetry data may include an indication of at least one of: an identification of an originating application of the network traffic, an identification of a receiving application of the network traffic, a server address, or a domain name.

Additionally, or alternatively, the telemetry data may include an indication of at least one of: an identity of the client device, or a type of the client device. Additionally, or alternatively, the telemetry data may include an indication of at least one of: an identity of an application in execution by the client device, or a type of an application in execution by the client device. Additionally, or alternatively, the telemetry data may include an indication of a location of the client device. Additionally, or alternatively, the telemetry data may include an indication of at least one of: an identity of a user of the client device, or a job title of the user of the client device.

Additionally, or alternatively, the telemetry data may include an indication of at least one of: a calendar event, or an attribute of the calendar event. For example, the indication may identify at least one of: a voice conference, a video conference, a video broadcast, or a remote meeting, where the attribute comprises at least one of: a start time, an end time, or a duration. The attribute may identify a role of a user of the client device in connection with the calendar event. The role may be selected from the group consisting of: host, and participant.

To identify the one or more priorities, the IHS may be configured to execute a Machine Learning (ML) or Artificial Intelligence (AI) algorithm configured to identify, based upon the telemetry data, priority changes that improve an experience or productivity of a user of the client device. The priority changes may be configured to reduce a packet drop or error rate of a prioritized packet stream.

The client device may be configured to allocate available bandwidth to the network traffic based, at least in part, upon a packet drop or error ratio. The policy may include one or more rules that indicate a Differentiated Services Code Point (DSCP) tag to be applied by at least one of: the client device, or an enterprise network device, to a packet's header based, at least in part, upon the priorities, where the DSCP tag is usable to prioritize or de-prioritize transmission of the packet. The enterprise network device may include at least one of: a router, an access point (AP), a switch, or a firewall.

The one or more rules may indicate a DSCP-to-WIFI Multimedia (WMM) access category mapping to be used in a wireless connection between the client device and the enterprise network device. Additionally, or alternatively, the one or more rules may indicate that a first packet with a given DSCP tag be mapped to a first WMM access category and that a second packet with the given DSCP tag be mapped to a second WMM access category, where the second WMM category is different than the first WMM category.

In another illustrative, non-limiting embodiment, a method may include: transmitting, from a client IHS to a remote service, telemetry data; receiving, at the client IHS from the remote service, a policy indicative of one or more priorities applicable to network traffic handled by the client IHS within an enterprise based, at least in part, upon telemetry data captured by the client IHS; and applying, by the client IHS, the policy to the network traffic.

In yet another illustrative, non-limiting embodiment, a memory storage device having program instructions stored thereon that, upon execution by an IHS, cause the IHS to: identify one or more priorities applicable to network traffic handled by the client device based, at least in part, upon telemetry data upon telemetry data provided by the client device; and transmit, to the client device, a policy produced based, at least in part, upon the one or more priorities, where the client device is configured to apply the policy to the network traffic.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIG. 5 depicts a flowchart of an example of a method for providing intelligent network traffic management, according to some embodiments.

DETAILED DESCRIPTION

Figure 1:
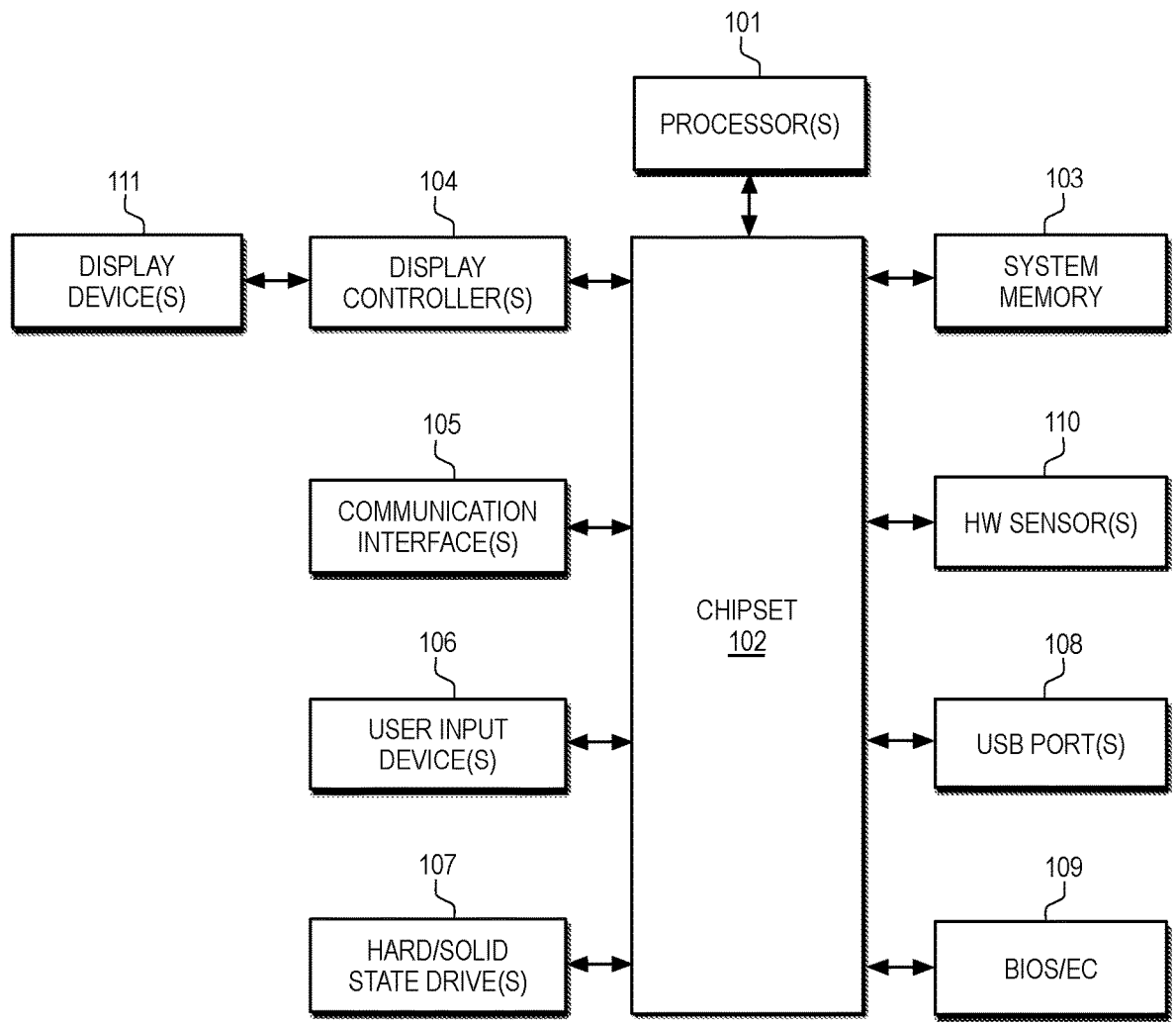
FIG. 1 depicts a block diagram of examples of components of an Information Handling System (IHS), according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include random access memory (RAM), one or more processing resources such as a central processing unit (CPU) or hardware or software control logic, ROM, and/or other types of nonvolatile memory. Additional components of an IHS may include one or more disk drives, one or more network ports for communicating with external devices as well as various input and output (I/O) devices, such as a keyboard, a mouse, touchscreen and/or a video display. An IHS may also include one or more buses operable to transmit communications between the various hardware components. A more detailed example of an IHS is described with respect to FIG. 1. It should be appreciated that although certain embodiments are discussed in the context of a personal computing device, other embodiments may utilize other types of IHSs.

Traffic prioritization, as an IHS network or communication feature, started appearing in the consumer market only a few years ago, but it has already become an integral part of traffic flow management. Current methods of traffic prioritization, however, are both closed loop and client IHS-based. That is, conventional traffic prioritization techniques rely solely upon the intelligence of a client device and follow a policy determined by that device.

As the inventors hereof have recognized, however, conventional techniques do not include knowledge of network throughput allocation by an Information Technology (IT) decision maker (ITDM) or administrator for specific (or all) devices. Moreover, with conventional techniques, ITDMs are not able to control traffic flows.

In contrast with conventional approaches, systems and methods described herein provide Managed Network Traffic Prioritization (MNTP). Particularly, these systems and methods provide a programmatic ability to manage the prioritization of connectivity based upon users, devices, environments, and/or context, for example: to save money (e.g., by minimizing unneeded data usage), to improve user efficiency and productivity, and/or to enhance the overall security posture of the user and enterprise. In some cases, these goals may be achieved through real-world monitoring of needs and threats posed by network access while performing sensitive work on a user's device.

To illustrate, consider a use case where a town-hall meeting or other enterprise-sponsored event is taking place. In that situation, a traffic management solution as disclosed herein may be deployed to prioritize event-based packet flows (over other flows). In another use case where the user is expected to operate their IHS in a remote meeting, for example, from a meeting room, a traffic management solution as disclosed herein may be deployed to prioritize context-based packet flows (e.g., depending upon the role of the user in the remote meeting). In yet another use case where the user is expected to operate their IHS from a public WI-FI network, a traffic management solution as disclosed herein may be deployed to prioritize location-based packet flows (e.g., depending upon the security clearance of the user).

As used herein, the term "packet" generally refers to a collection of data that can be used by IHSs and other devices to communicate with each other, usually as part of a network (e.g., the Internet). A packet comprises of two types of data: packet information (typically stored in a "header" portion), and packet data (or a "payload" portion). In operation, IHS 100 and/or network device(s) 200 may use the control information in a packet's header to decide where, when, and/or how, to send that packet.

In various embodiments, systems and methods described herein may be used to manage an ITDM's prioritization of traffic flow on a client device-instead of managing traffic with on-device agentry-which would otherwise be static and dependent on application traffic.

In some cases, network devices such as WI-FI Access Points (APs), or the like, may configure a Differentiated Services Code Point (DSCP)-to-user priority/access category mapping table on each client device. When activated, a client device's agent may assign a Wi-Fi Multimedia (WMM) access category for transmission of each uplink packet based on the DSCP marking in its IP header. Each AP may do the same for its own downlink transmissions.

Particularly, an OS service or agent instantiated by a client device may be responsible for processing a policy from an ITDM, transmitting telemetry and/or contextual data (e.g., calendar events, location of the client device, network usage, etc.) to a cloud orchestrator, and tagging IP packets with appropriate DSCP tags (according to the classification described herein).

The cloud orchestrator may in turn be configured to: collect and process telemetry from client devices, analyze client data make intelligent decisions about priorities, and/or inform an IT management console of upcoming events and client prioritization of traffic (e.g., companywide events, webinars, etc.)

Furthermore, the ITDM may be responsible for the configuration of the enterprise's policy on a management server to manage traffic flow, and/or communications with client device's OS agent (e.g., policies).

FIG. 1 is a block diagram of components of IHS, according to some embodiments. As depicted, IHS 100 includes processor 101. In various embodiments, IHS 100 may be a single-processor system, or a multi-processor system including two or more processors. Processor 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 102 coupled to processor 101. Chipset 102 may provide processor 101 with access to several resources. In some cases, chipset 102 may utilize a QuickPath Interconnect (QPI) bus to communicate with processor 101. Chipset 102 may also be coupled to communication interface(s) 105 to enable communications between IHS 100 and various wired and/or wireless networks, such as Ethernet, WIFI, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like. In some cases, communication interface(s) 105 may be used to communicate with peripheral devices (e.g., displays, speakers, microphones, headsets, docking stations, printers, etc.). Moreover, communication interface(s) 105 may be coupled to chipset 102 via a Peripheral Component Interconnect Express (PCIe) bus, or the like.

Chipset 102 may be coupled to display controller(s) 104, which may include one or more or graphics processor(s) (GPUs) on a graphics bus, such as an Accelerated Graphics Port (AGP) or PCIe bus. As shown, display controller(s) 104 provide video or display signals to display device 111. In other implementations, any number of display controllers or devices may be used.

Display device 111 may include Liquid Crystal Display (LCD), Light Emitting Diode (LED), organic LED (OLED), or other thin film display technologies. Display device 111 may include a plurality of pixels arranged in a matrix, configured to display visual information, such as text, two-dimensional images, video, three-dimensional images, etc. In some cases, display device 111 may be provided as two or more discrete displays.

Chipset 102 may provide processor 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like. Memory 103 may store program instructions that, upon execution by processor 101, enable the instantiation of an intelligent workspace connection assistant, as described below.

Chipset 102 may also provide access to one or more hard disk and/or solid-state drives 107. In certain embodiments, chipset 102 may also provide access to one or more optical drives or other removable-media drives. In certain embodiments, chipset 102 may provide access to one or more USB ports 108, to which one or more peripheral devices may be coupled (e.g., internal or external webcams, microphones, speakers, docking stations, displays, etc.).

Chipset 102 may further provide access to one or more user input devices 106, for example, using a super I/O controller or the like. Examples of user input devices 106 include, but are not limited to, a keyboard, mouse, touchpad, stylus or active pen, dial totem, etc. Each of user input devices 106 may include a respective controller (e.g., a touchpad may have its own touchpad controller) that interfaces with chipset 102 through a wired or wireless connection (e.g., via communication interfaces(s) 105).

In certain embodiments, chipset 102 may also provide an interface for communications with one or more hardware (HW) sensors 110. Sensors 110 may be disposed on or within the chassis of IHS 100, and may include, but are not limited to: electric, magnetic, radio, optical, infrared, thermal, force, pressure, acoustic, ultrasonic, proximity, position, deformation, bending, direction, movement, velocity, rotation, and/or acceleration sensor(s).

Upon booting of IHS 100, processor(s) 101 may utilize Basic Input/Output System (BIOS) instructions of BIOS/Embedded Controller (EC) 109 to initialize and test hardware components coupled to IHS 100 and to load an OS for use by IHS 100. BIOS 109 provides an abstraction layer that allows the OS to interface with certain hardware components that are utilized by IHS 100. Via the hardware abstraction layer provided by BIOS 109, software stored in system memory 103 and executed by processor 101 can interface with certain I/O devices that are coupled to IHS 100. The Unified Extensible Firmware Interface (UEFI) was designed as a successor to BIOS. As a result, many modern IHSs utilize UEFI in addition to or instead of a BIOS. As used herein, BIOS 109 is intended to also encompass a UEFI component.

EC 109 may be installed as a Trusted Execution Environment (TEE) component to the motherboard of IHS 100. EC 109 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 109 may be used to provide various core operations of IHS 100, such as power management and management of certain modes of IHS 100 (e.g., turbo modes, maximum clock frequencies of certain components, etc.).

EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component. Such hash values may be calculated as part of a trusted process of manufacturing IHS 100 and may be maintained in secure storage as a reference signature. EC 109 may later recalculate the hash value for a component may compare it against the reference hash value to determine if any modifications have been made to the component, thus indicating that the component has been compromised. In this manner, EC 109 may validate the integrity of hardware and software components installed on IHS 100.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be provided by components integrated into processor(s) 101 as systems-on-a-chip (SoC). As such, in certain embodiments, IHS 100 may be implemented as different classes of computing devices including, but not limited to: servers, workstations, desktops, laptops, appliances, video game consoles, tablets, smartphones, etc.

Figure 2:
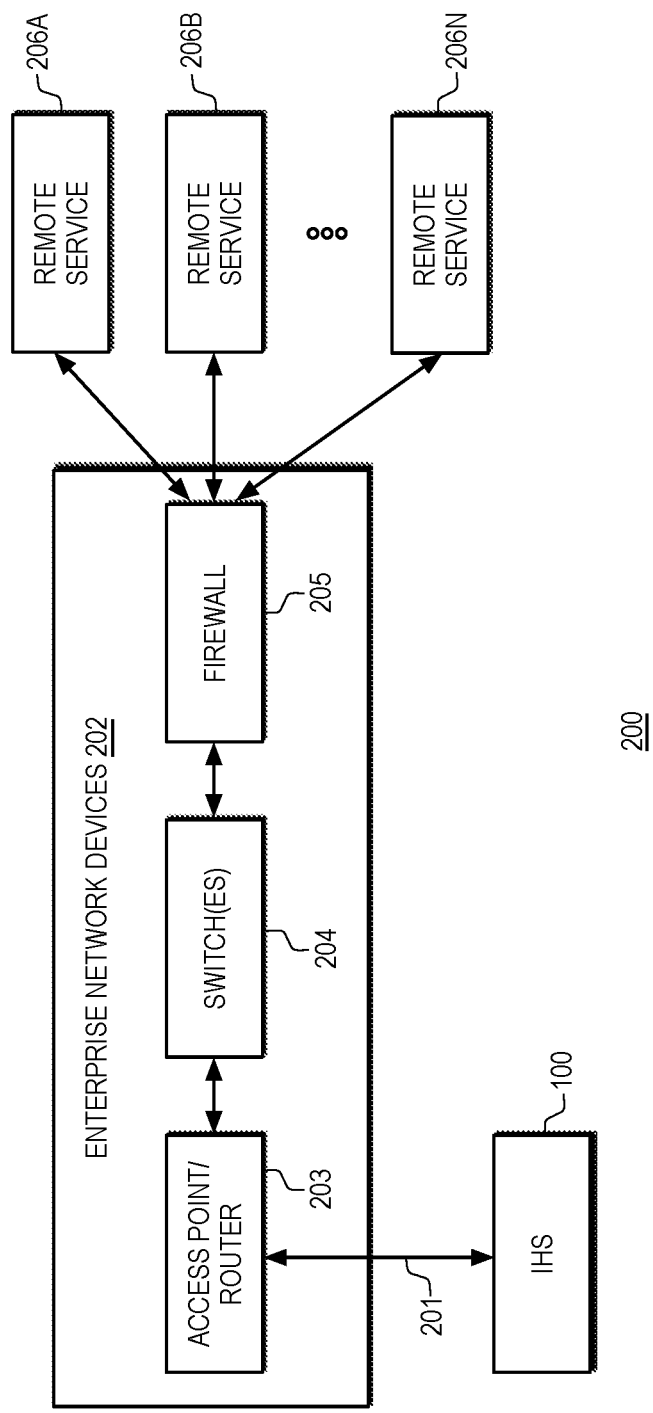
FIG. 2 depicts a block diagram of an example of an enterprise network, according to some embodiments.

FIG. 2 depicts a block diagram of an example of enterprise network 200. As shown, client IHS or device 100 is configured to establish wireless connection 201 (e.g., WIFI, etc.) within enterprise network 200. Enterprise network 200 may include devices 202 such as, for example, access point (AP) and/or router 203, switch(es) 204 (e.g., layer 2, layer 3, etc.), and firewall 205. In some cases, enterprise network devices 202 may also include load balancers, intrusion detection devices, gateways, etc. Moreover, client IHS or device 100 may be configured to access remote services 206A-N through enterprise network devices 202.

In various embodiments, client IHS or device 100 and/or enterprise network devices 202 may send data packets tagged with appropriate DSCP tags in packet headers, which may be recognized, and its transmission and/or processing prioritized, by that device accordingly.

In some cases, selected packets may be prioritized or deprioritized for improved user experience (e.g., lower latency, greater throughput, etc.). Additionally, or alternatively, selected packets may be prioritized or deprioritized to meet an enterprise's security requirements (e.g., depending upon the user's location). Additionally, or alternatively, selected packets may be prioritized or deprioritized to improve attendance of a particular event (e.g., a town-hall meeting). Additionally, or alternatively, selected packets may be prioritized or deprioritized to satisfy a user's particular meeting role (e.g., host or participant). Additionally, or alternatively, priority changes may be configured to reduce a packet drop or error rate of a prioritized packet stream. Moreover, priority changes may be configured to allocate available bandwidth to the network traffic based, at least in part, upon a packet drop or error ratio.

Figure 3:
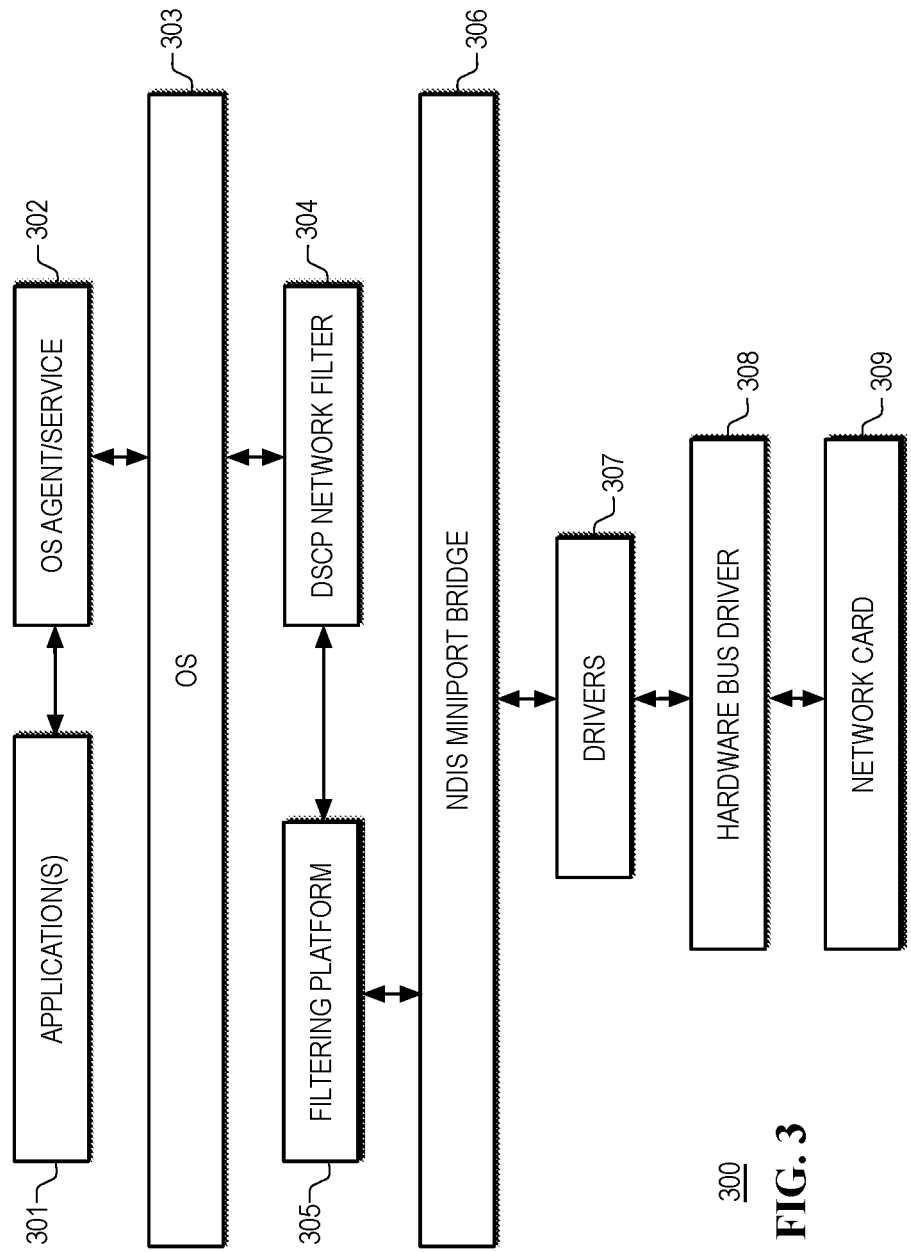
FIG. 3 depicts a block diagram of an example of a system for providing intelligent network traffic management, according to some embodiments.

FIG. 3 depicts a block diagram of an example of system 300 for providing intelligent network traffic management. In various embodiments, system 300 may include components instantiated by IHS 100 in response to the execution of program instructions stored in memory 103. Particularly, in user space, system 300 may include one or more application(s) 301 in communication with OS agent or service 302, both executed by Operating System (OS) 303. OS 303 may include for example, WINDOWS, MAC OS, LINUX, CHROME OS, IOS, etc.

OS agent or service 302 may be configured to detect and prioritize network traffic to and from a subset of application(s) 301, for example, based upon a policy received from an ITDM. Such a policy may be indicative of one or more priorities applicable to network traffic handled by IHS 100 based, at least in part, upon telemetry data captured by IHS 100.

Moreover, the one or more priorities may be identified at least in part, based upon the application or a Machine Learning (ML) or Artificial Intelligence (AI) algorithm upon telemetry data including an indication of at least one of: a number of packets or amount of data transmitted, a number of packets or amount of data received, a number of packet drops or errors, a latency metric, a throughput metric, packet tracing information, a sample packet stream, an identification of an originating application of the network traffic, an identification of a receiving application of the network traffic, a server address, a domain name, an identity of the client device, a type of the client device, an identity of an application in execution by the client device, a type of an application in execution by the client device, a location of the client device, an identity of a user of the client device, a job title of the user of the client device, a calendar event (e.g., a voice conference, a video conference, a video broadcast, or a remote meeting), an attribute of the calendar event (e.g., a start time, an end time, a duration, a role of a user in the event-host, participant, etc.), and so on.

In kernel space, system 300 may include DSCP network filter 304, generally operating at layer 3—transport layer, and filtering platform 305. Filtering platform 305 is coupled to Network Driver Interface Specification (NDIS) miniport bridge 306. NDIS miniport bridge 306 provides an interface between protocol drivers (e.g., 304 and/or 305) and network adapter drivers (e.g., 307), allowing various network devices to communicate. As such, NDIS miniport bridge 306 is coupled to drivers 307, generally operating at layer 2—data link layer, hardware bus driver 308, and network card or adapter 309.

In operation, system 300 may be configured to intercept network traffic at different layers for optimized traffic routing and bandwidth management, for example, using input/output control (IOCTL) commands.

Figure 4:
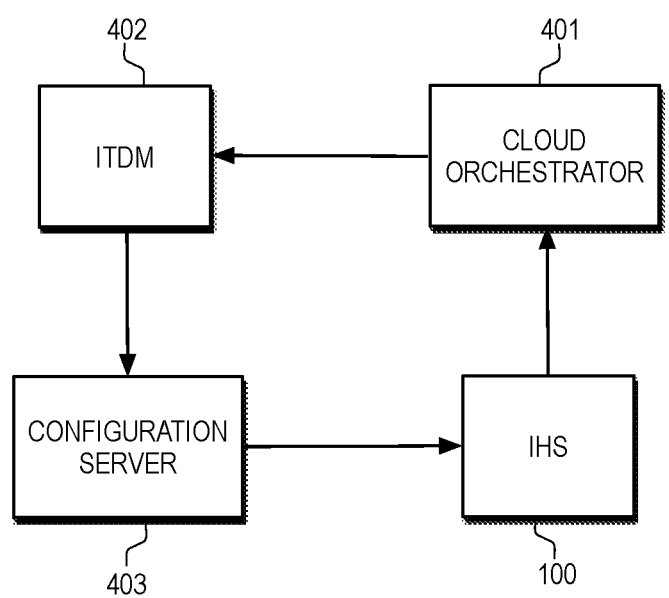
FIG. 4 depicts a block diagram of an example of a system for configuring intelligent network traffic management policies, according to some embodiments.

FIG. 4 depicts a block diagram of an example of system 400 for configuring intelligent network traffic management policies. Specifically, ITDM or administrator 402 may be configured to generate network traffic policies for deployment by IHS 100, for example, via an IT management console or the like.

ITDM policies may be created in JavaScript Object Notation (JSON) or Extensible Markup Language (XML) formats; although other formats or syntax may be used. In some cases, for example, a network traffic policy may include a priority (e.g., a DSCP tag, WMM value, etc.) associated with a particular type of packet traffic (e.g., received or transmitted by a selected application executed by IHS 100) in a given context (e.g., in response to a calendar event, time-of-day, IHS location, etc.).

For example, a policy may include one or more rules that indicate a DSCP tag to be applied by IHS 100 and/or an enterprise network device 202 to a packet's header, such that the DSCP tag is usable to prioritize or de-prioritize transmission of a corresponding packet. In some cases, these rules may also indicate a DSCP-to-WMM access category mapping to be used in a wireless connection between IHS 100 and an enterprise network device. In some cases, one such rule may indicate that a first packet with a given DSCP tag be mapped to a first WMM access category, and that a second packet with the same DSCP tag be mapped to a different WMM access category (e.g., based on context).

Network traffic policies created by ITDM 402 may be provided to configuration service 403, which then updates IHS 100 on demand or following an update schedule. A user of IHS 100 may launch applications (e.g., web browser, video conferencing, etc.) that communicate through enterprise network 200 subject to the policy. In some cases, OS agent or service 302 may receive a network traffic management policy and send it to DSCP network filter 304, which proceeds to apply priority tags to network packets following one or more policy rules, for example, based upon context.

OS agent or service 302 may collect telemetry data and transmit the telemetry data to cloud orchestrator 401 (e.g., one or remote services 206A-N). Cloud orchestrator 401 may be configured to execute one or more ML/AI models upon the telemetry data to determine whether changes to traffic routing provided by the current policy can be improved to achieve a particular Key Performance Indicator (KPI), such as a user experience metric, a productivity metric, latency, throughput, etc. These changes may then be communicated to ITDM 402, which may use hints received from cloud orchestrator to modify an existing policy or create a new policy for IHS 100.

In some implementations, one or more components of system 400 may be combined and/or separated from each other. For example, in some cases configuration service 403 may be combined with ITDM device/server 402 and/or cloud orchestrator 401. In other cases, aspects of cloud orchestrator 401 may by implemented by IHS 100.

FIG. 5 depicts a flowchart of an example of method 500 for providing intelligent network traffic management. In various embodiments, method 500 may be performed, at least in part, by system 400 of FIG. 4.

At 501, IHS 100 completes a handshake with AP/router 203 and indicates support for MNTP. At 502, ITDM management tool 402 triggers traffic prioritization across a fleet of enterprise IHSs, for example. At 503, AP/router 203 configures a unique DSCP-to-user priority/access category mapping table for each connected IHS.

At 504, IHS 100 assigns WMM access categories to each application packet by updating DSCP tags in the packets' headers. At 505, IHS 100 collects information indicative of packet drop and/or error rate for each priority in the downlink. At 506, method 500 determines whether IHSs needs are properly addressed by current prioritization. If so, control returns to 505.

Otherwise, at 507, IHS 100 evaluates a packet drop ratio for each priority and recommends new weights. At 508, IHS 100 communicates updated weights though an Out-of-Band channel to ITDM 402, and control returns to 505. As such, ITDM 403 may be responsible for traffic prioritization based on telemetry and/or event needs. IHS 100 may be responsible for application detection and priority mapping based on the configuration from ITDM 402.

IHS 100 may access packet drop ratios P1e:P2e:P3e:P4e; where Pn is based on DSCP mapping provided by ITDM 402 (and/or a Cloud Prioritization Manager or the like). Moreover, bandwidth (BW) management may be performed on IHS 100 depending on the available bandwidth allocation from AP. In some cases, allocated BW may be communicated by AP 203 through with WIFI assignments.

For example, to make sure the overall bandwidth IHS 100 can get remains the same irrespective of the priorities, an equation such as: $BW(P1)+BW(P2)+BW(P3)+BW(P4)=B$ may be used such that $BW(Pk)$ can vary for each k. In that case, IHS 100 may recommend a modified packet drop to ITDM 402 (when packets are being dropped, otherwise the IHS's bandwidth needs are reduced, and the equality may not be required).

As such, systems and methods described herein may enable all IHSs with a same policy based on Quality of Service (QoS) prioritization between flows according to DSCP markings. Moreover, these systems and methods may provide ITDM/cloud-managed controls based upon telemetry and situational needs for traffic management.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor; and
a memory coupled to the processor, the memory having program instructions stored thereon that, upon execution, cause the IHS to:
identify one or more priorities applicable to network traffic handled by a client device based, at least in part, upon telemetry data received provided by the client device; and
transmit, to the client device, a policy determined based, at least in part, upon the one or more priorities, wherein the client device is configured to apply the policy to the network traffic, wherein the policy comprises one or more rules that indicate a Differentiated Services Code Point (DSCP)-to-WIFI Multimedia (WMM) access category mapping to be used in a wireless connection between the client device and the enterprise network device, wherein the one or more rules indicate that a first packet with a given DSCP tag be mapped to a first WMM access category and that a second packet with the given DSCP tag be mapped to a second WMM access category, and wherein the second WMM category is different than the first WMM category.

2. The IHS of claim 1, wherein the telemetry data comprises an indication of at least one of: a number of packets or amount of data transmitted, a number of packets or amount of data received, a number of packet drops or errors, a latency metric, a throughput metric, packet tracing information, or a sample packet stream.

3. The IHS of claim 1, wherein the telemetry data comprises an indication of at least one of: an identification of an originating application of the network traffic, an identification of a receiving application of the network traffic, a server address, or a domain name.

4. The IHS of claim 1, wherein the telemetry data comprises an indication of at least one of: an identity of the client device, or a type of the client device.

5. The IHS of claim 1, wherein the telemetry data comprises an indication of at least one of: an identity of an application in execution by the client device, or a type of an application in execution by the client device.

6. The IHS of claim 1, wherein the telemetry data comprises an indication of a location of the client device.

7. The IHS of claim 1, wherein the telemetry data comprises an indication of at least one of: an identity of a user of the client device, or a job title of the user of the client device.

8. The IHS of claim 1, wherein the telemetry data comprises an indication of at least one of: a calendar event, or an attribute of the calendar event.

9. The IHS of claim 8, wherein the indication identifies at least one of: a voice conference, a video conference, a video broadcast, or a remote meeting, and wherein the attribute comprises at least one of: a start time, an end time, or a duration.

10. The IHS of claim 8, wherein the attribute identifies a role of a user of the client device in connection with the calendar event.

11. The IHS of claim 10, wherein the role is selected from the group consisting of: host, and participant.

12. The IHS of claim 1, wherein to identify the one or more priorities, the IHS is configured to execute a Machine Learning (ML) or Artificial Intelligence (AI) algorithm configured to identify, based upon the telemetry data, priority changes that improve an experience or productivity of a user of the client device.

13. The IHS of claim 12, wherein the priority changes are configured to reduce a packet drop or error rate of a prioritized packet stream.

14. The IHS of claim 13, wherein the client device is configured to allocate available bandwidth to the network traffic based, at least in part, upon a packet drop or error ratio.

15. The IHS of claim 1, wherein the policy comprises one or more rules that indicate a Differentiated Services Code Point (DSCP) tag to be applied by at least one of: the client device, or an enterprise network device, to a packet's header based, at least in part, upon the priorities, wherein the DSCP tag is usable to prioritize or de-prioritize transmission of the packet.

16. The IHS of claim 15, wherein the enterprise network device comprises at least one of: a router, an access point (AP), a switch, or a firewall.

17. A method, comprising:
transmitting, from a client Information Handling System (IHS) to a remote service, telemetry data;
receiving, at the client IHS from the remote service, a policy indicative of one or more priorities applicable to network traffic handled by the client IHS within an enterprise based, at least in part, upon telemetry data captured by the client IHS; and
applying, by the client IHS, the policy to the network traffic, wherein the policy comprises one or more rules that indicate a Differentiated Services Code Point (DSCP)-to-WIFI Multimedia (WMM) access category mapping to be used in a wireless connection between the client device and the enterprise network device, wherein the one or more rules indicate that a first packet with a given DSCP tag be mapped to a first WMM access category and that a second packet with the given DSCP tag be mapped to a second WMM access category, and wherein the second WMM category is different than the first WMM category.

18. A memory storage device having program instructions stored thereon that, upon execution by an Information Handling System (IHS), cause the IHS to:
identify one or more priorities applicable to network traffic handled by the client device based, at least in part, upon telemetry data upon telemetry data provided by the client device; and
transmit, to the client device, a policy produced based, at least in part, upon the one or more priorities, wherein the client device is configured to apply the policy to the network traffic, wherein the policy comprises one or more rules that indicate a Differentiated Services Code Point (DSCP)-to-WIFI Multimedia (WMM) access category mapping to be used in a wireless connection between the client device and the enterprise network device, wherein the one or more rules indicate that a first packet with a given DSCP tag be mapped to a first WMM access category and that a second packet with the given DSCP tag be mapped to a second WMM access category, and wherein the second WMM category is different than the first WMM category.

* * * * *